No. 622,687. Patented Apr. 11, 1899.
C. HOLYLAND & C. G. DICE.
BICYCLE NAME PLATE.
(Application filed Dec. 8, 1897.)
(No Model.)
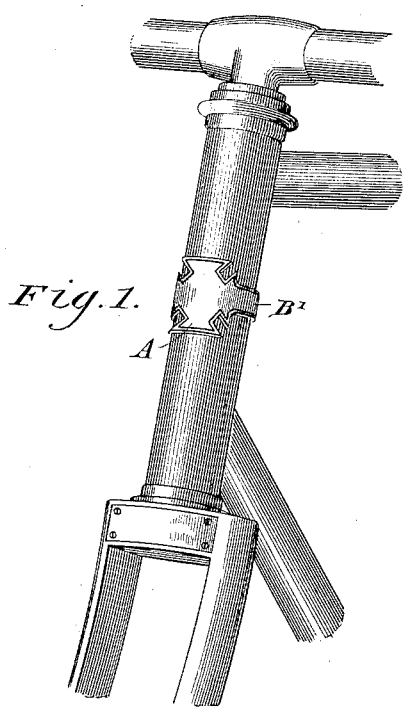
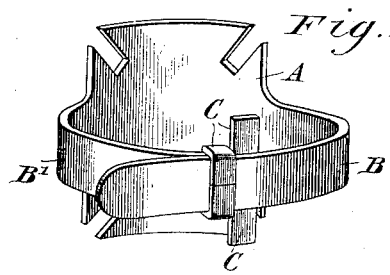 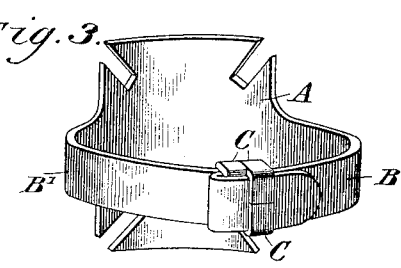
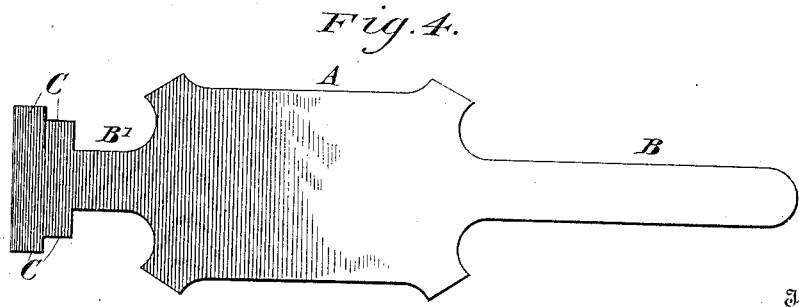
Witnesses
Inventors
Charles Holyland
and Charles G. Dice,
Attorneys

UNITED STATES PATENT OFFICE.

CHARLES HOLYLAND AND CHARLES G. DICE, OF PITTSBURG, PENNSYLVANIA.

BICYCLE NAME-PLATE.

SPECIFICATION forming part of Letters Patent No. 622,687, dated April 11, 1899.

Application filed December 8, 1897. Serial No. 661,189. (No model.)

*To all whom it may concern:*

Be it known that we, CHARLES HOLYLAND and CHARLES G. DICE, residing at Pittsburg, in the county of Allegheny and State of Pennsylvania, have invented a new and useful Bicycle Name-Plate, of which the following is a specification.

This invention relates to bicycle nameplates; and the object thereof is to provide a plate capable of being readily attached to any bicycle and having an improved fastening means whereby it may be retained in position thereon, the plate being simple in construction and cheap of manufacture.

With the above objects in view the invention consists of a plate having straps adapted to embrace the frame of the wheel, one of said straps having lateral tongues formed upon its edges, one pair of tongues adapted to be bent to form a loop, through which the end of the opposite strap is passed, said strap being bent backward upon the loop and held in position by the other pair of lateral tongues, which are bent thereupon.

The invention further consists in the improved construction, arrangement, and combination of parts hereinafter fully described and afterward specifically pointed out in the claim.

In order to enable others skilled in the art to which our invention most nearly appertains to make and use the same, we will now proceed to describe its construction and operation, having reference to the accompanying drawings, forming part of this specification, in which—

Figure 1 is a view of a portion of a bicycle, showing our plate applied thereto. Fig. 2 is a perspective view of the plate, showing the first step in fastening the same to the bicycle. Fig. 3 is a similar view showing the position of the parts when the plate is secured upon the frame. Fig. 4 is a plan view of the blank from which the plate is made, the plate in this figure being of somewhat different contour.

Like letters of reference mark the same parts wherever they occur in the various figures of the drawings.

In the accompanying drawings, A indicates the plate, which may be of any desired form, the same in the present instance being shown in the form of a Maltese cross and having the straps B B' extending from opposite edges thereof and formed integral therewith. The strap B' has pairs of laterally-extending tongues C projecting from opposite edges thereof at its outer end. These tongues are formed by enlarging said strap laterally on each edge at its outer end and slitting said enlargement inwardly to form two tongues on each edge, the outer pair of tongues being somewhat greater in length than the inner pair, as clearly illustrated in Fig. 4, for the purpose presently to be set forth.

In operation the plate is positioned upon the frame of the bicycle, with the straps embracing the same and overlapping each other, the strap B being outermost. The inner pair of retaining-tongues C are then bent inwardly upon the outer face of tongue D, as shown in Fig. 2. The end of said tongue is then bent backwardly upon the loop formed by the inner pair of tongues C and engages the main portion of said strap. The outer pair of retaining-tongues C are then bent inwardly upon the doubled end of the strap, as shown in Fig. 3, and the same are, as before stated, formed slightly greater in extent than the inner pair, so as to be readily bent over the strap B and the backwardly-bent end thereof. In this position the straps are positively locked together and prevented from becoming disengaged.

From the above description it will be seen that we have produced a name-plate having a very simple construction of fastening means, whereby the plate may be readily positioned upon the frame of the bicycle and retained thereon.

It will be understood that our invention might be used in other connections than as a name-plate—that is, the improved fastening-strap—without in any way departing from the spirit and scope of the invention.

While we have illustrated and described the best means now known to us for carrying out our invention, we do not wish to be understood as restricting ourselves to the exact details of construction shown and described, but hold that any slight changes or variations such as might suggest themselves to the ordinary mechanic will properly fall within the limit and scope of our invention.

Having thus fully described our invention, what we claim as new, and desire to secure by Letters Patent of the United States, is—

A name-plate comprising the plate proper and a projecting strap at each end, one strap being provided with two laterally-projecting wings or tongues on each side forming oppositely-located pairs, the outer pair being slightly longer than the inner pair, and the other strap being plain and of a width about equal to one-half the width from tip to tip of the inner pair of wings of the first-mentioned strap, the plate and straps being adapted to be bent around a post, the second strap overlapping the first secured by bending the inner pair of wings over it and bent back, and again secured by bending the outer pair of wings over it, substantially as described.

CHARLES HOLYLAND.
CHARLES G. DICE.

Witnesses:
HENRY F. WEAVER,
NEWTON K. DELAVAN.